United States Patent [19]
Machado

[11] Patent Number: 6,155,871
[45] Date of Patent: Dec. 5, 2000

[54] ELECTRIC CABLE JUNCTION BOX ASSEMBLY

[75] Inventor: Peter W. Machado, Fairhaven, Mass.

[73] Assignee: The United States of America as represented by the Secretary of the Navy, Washington, D.C.

[21] Appl. No.: 09/168,337

[22] Filed: Oct. 5, 1998

[51] Int. Cl.[7] .................................................. H01R 13/60
[52] U.S. Cl. ............................................................ 439/535
[58] Field of Search ..................................... 439/535, 650, 439/651, 652, 654, 655, 638, 639, 502, 623, 528; 174/58, 68.1, 71 R; 220/3.2

[56] References Cited

U.S. PATENT DOCUMENTS

| | | | |
|---|---|---|---|
| 3,624,594 | 11/1971 | Trimble et al. | 439/523 |
| 3,845,454 | 10/1974 | Hayward et al. | 439/307 |
| 3,989,333 | 11/1976 | Cauldwell | 439/76.1 |
| 4,226,495 | 10/1980 | Palle et al. | 439/535 |
| 4,571,018 | 2/1986 | Annoot | 439/281 |
| 4,747,791 | 5/1988 | Nishio | 439/638 |
| 4,956,561 | 9/1990 | Tamer | 307/10.1 |
| 5,735,711 | 4/1998 | Fremgen | 439/578 |
| 5,906,512 | 5/1999 | Reynolds | 439/579 |
| 5,911,600 | 6/1999 | Mosquera | 439/655 |
| 5,984,719 | 11/1999 | Flegel | 439/528 |

*Primary Examiner*—Neil Abrams
*Assistant Examiner*—Michael C. Zarroli
*Attorney, Agent, or Firm*—Michael J. McGowan; Robert W. Gauthier; Prithvi C. Lall

[57] ABSTRACT

An electric cable junction box assembly includes a main body having a hole therethrough. A junction box main connector assembly is fixed in the hole and is provided with electrical leads adapted to receive a main cable end connector. A junction box secondary connector assembly is fixed in a second hole in the body, the junction box secondary connector assembly being adapted to receive a secondary cable end connector. A wiring harness in the main body is connected to the junction box main connector assembly, and a branch of the wiring harness extends from a remainder of the wiring harness and is fixed to the junction box secondary connector assembly.

13 Claims, 3 Drawing Sheets

000
ELECTRIC CABLE JUNCTION BOX ASSEMBLY

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The invention relates to electric cable junction boxes and is directed more particularly to a submersible and repairable electric cable junction box suitable for use on underwater vehicles, such as submarines.

(2) Description of the Prior Art

Electric cable junction boxes are known in the art. In U.S. Pat. No. 1,862,811, issued Jun. 14, 1932 to A. J. Strong, there is shown a junction box for outdoor use, as on telephone poles, and the like, and supporting a main cable and having facility for securing within the box a number of leads taken off the main cable.

In U.S. Pat. No. 3,989,333, issued Nov. 2, 1976 to Jack D. Cauldwell, there is shown and described a junction box for cable television, the box having a connector for engaging a trunk cable. Distribution cables are run from the trunk cable.

In U.S. Pat. No. 4,956,561, issued Sep. 11, 1990 to Antanios B. Tamer, there is presented a junction box which provides for connections between a power source and various devices and components of a vehicle.

The junction boxes disclosed in the above patents include removable covers and are not regarded as hermetically sealed and therefore not reliable for underwater use. Further, the terminal posts and/or circuit boards housed in the disclosed boxes are generally expensive components.

In vertical launch systems of submarines, a molded electric cable junction box is used for various outboard missile tube cabling. Because of its molded design, the current junction box is non-repairable. If a junction box is determined to be faulty, it cannot be repaired or re-wired, and must be discarded.

Accordingly, there is a need for such a junction box which is water tight and repairable, and which provides access to internal wiring.

An object of the invention is, therefore, to provide an electric cable junction box for use on underwater vehicles in an outboard environment.

A further object of the invention is to provide such a junction box which is repairable and susceptible to re-wiring.

A still further object of the invention is to provide such a junction box which is adapted to receive standard military cable end connectors.

SUMMARY OF THE INVENTION

With the above and other objects in view, as will hereinafter appear, a feature of the invention is the provision of an electric cable junction box assembly comprising a tubular main body having a first plate extending across a first end thereof, the first plate having a hole therethrough, and a second plate extending across a second end thereof. A junction box main connector assembly is fixed in the hole in the first plate and is provided with electrical leads fixed in a recess in the junction box main connector assembly, the leads and the recess being adapted to receive a main cable end connector. A junction box secondary connector assembly is fixed in a selected one of a hole in a side wall of the main body and a hole in the second plate, the junction box secondary connector assembly having electrical leads fixed in a recess therein and being adapted to receive a secondary cable end connector. A wiring harness in the main body is connected to the junction box main connector assembly and is in electrical communication with the junction box main connector assembly leads. A branch of the wiring harness extends from a remainder of the wiring harness and is fixed to the junction box secondary connector assembly and is in electrical communication with the junction box secondary connector assembly leads.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent, wherein corresponding reference characters indicate corresponding parts throughout the several views of the drawings and wherein.

DESCRIPTION OF THE PREFERRED EMBODIMENT

Figure 3:
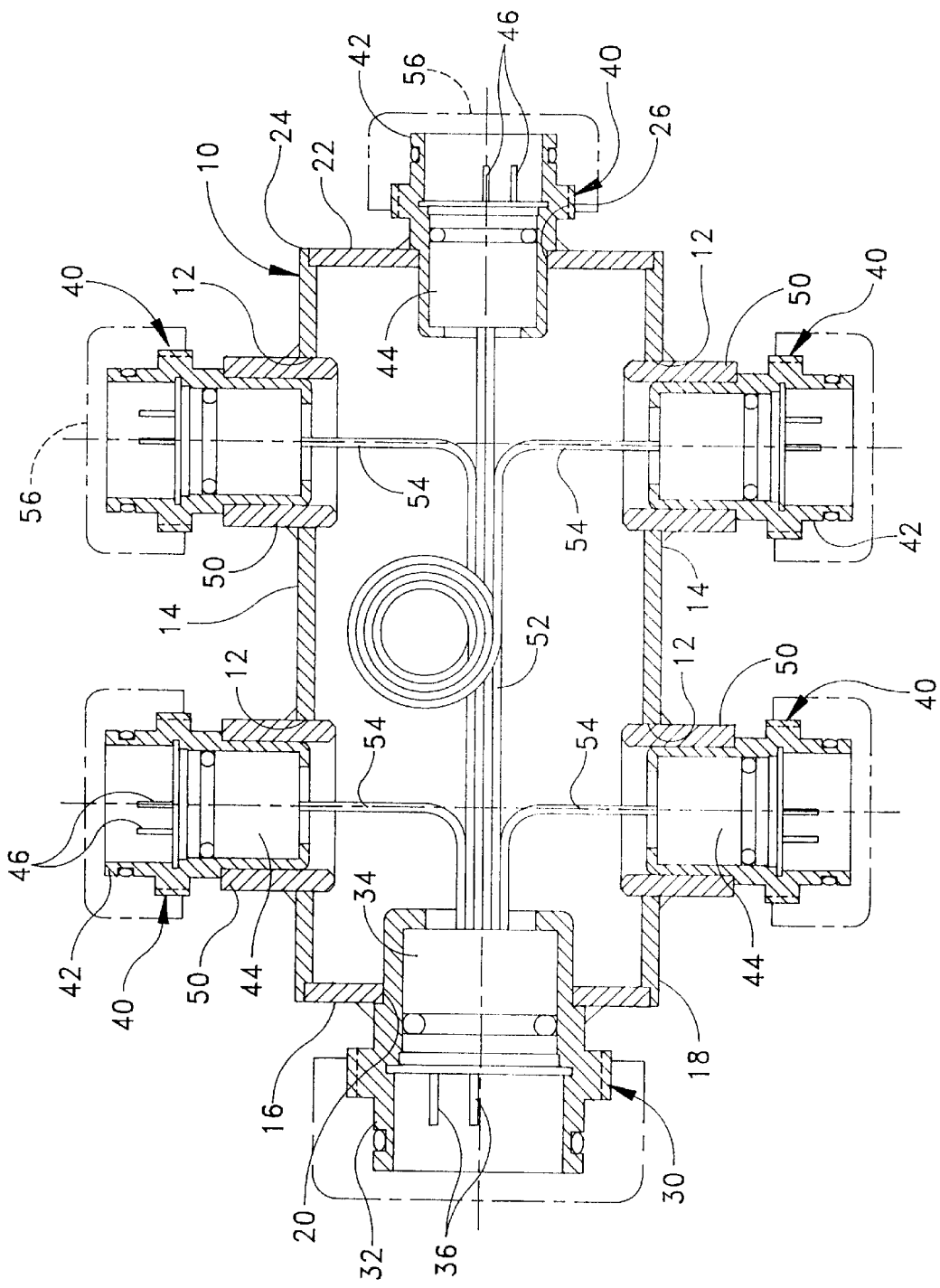
FIG. 3 is a sectional view of the junction box assembly of FIG. 2.

Referring to the drawings, it will be seen that the illustrative embodiment includes a tubular main body 10 which may be provided with one or more holes 12 (FIG. 3) in a side wall 14 thereof. A first plate 16 extends across a first end 18 of main body 10 and is provided with a first end hole 20 (FIG. 3). A second plate 22 extends across a second end 24 of main body 10 and may be provided with a second end hole 26 (FIG. 3).

Figure 1:
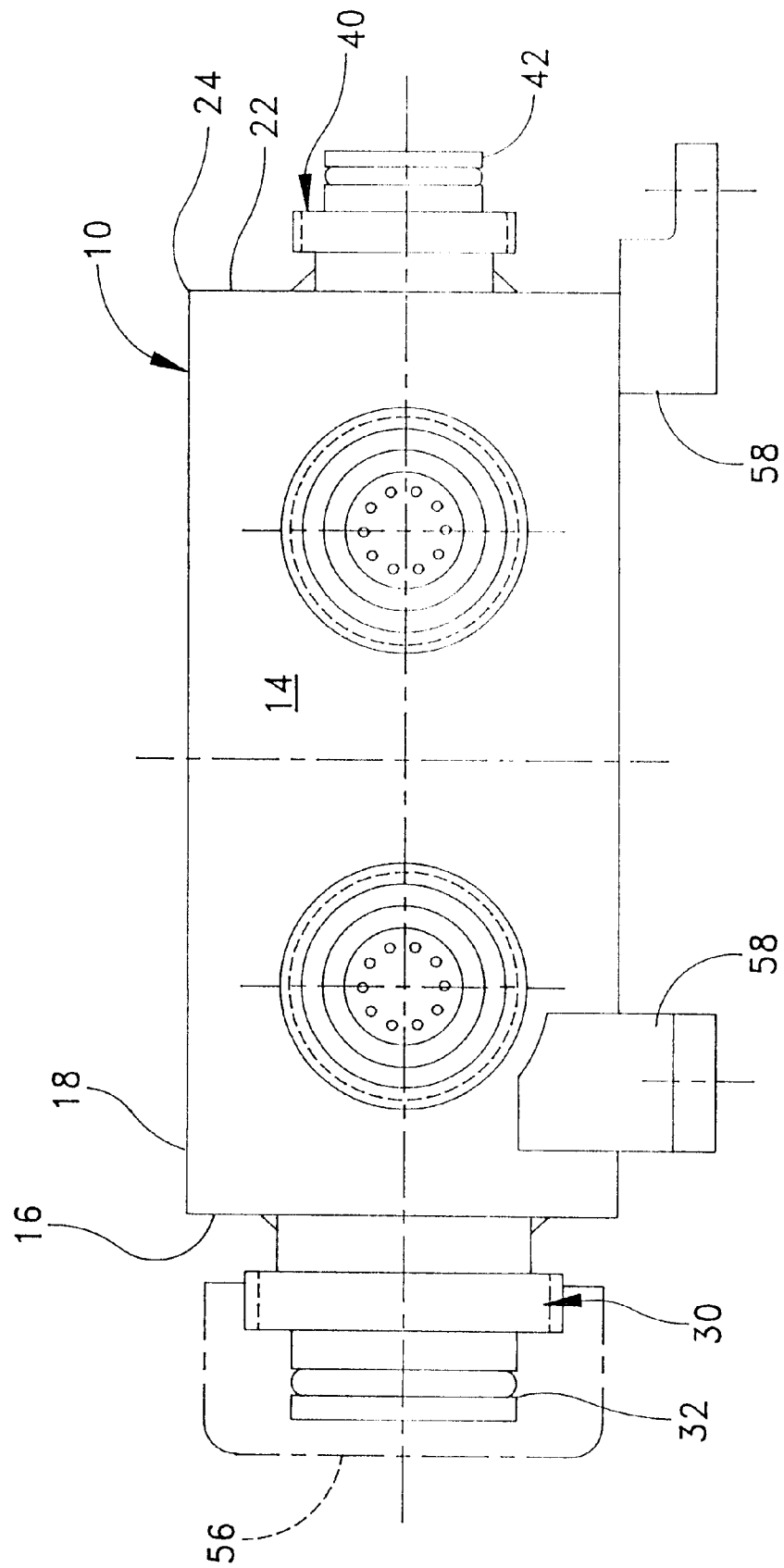
FIG. 1 is a side elevational view of one form of electric cable junction box assembly illustrative of an embodiment of the invention.
Figure 2:
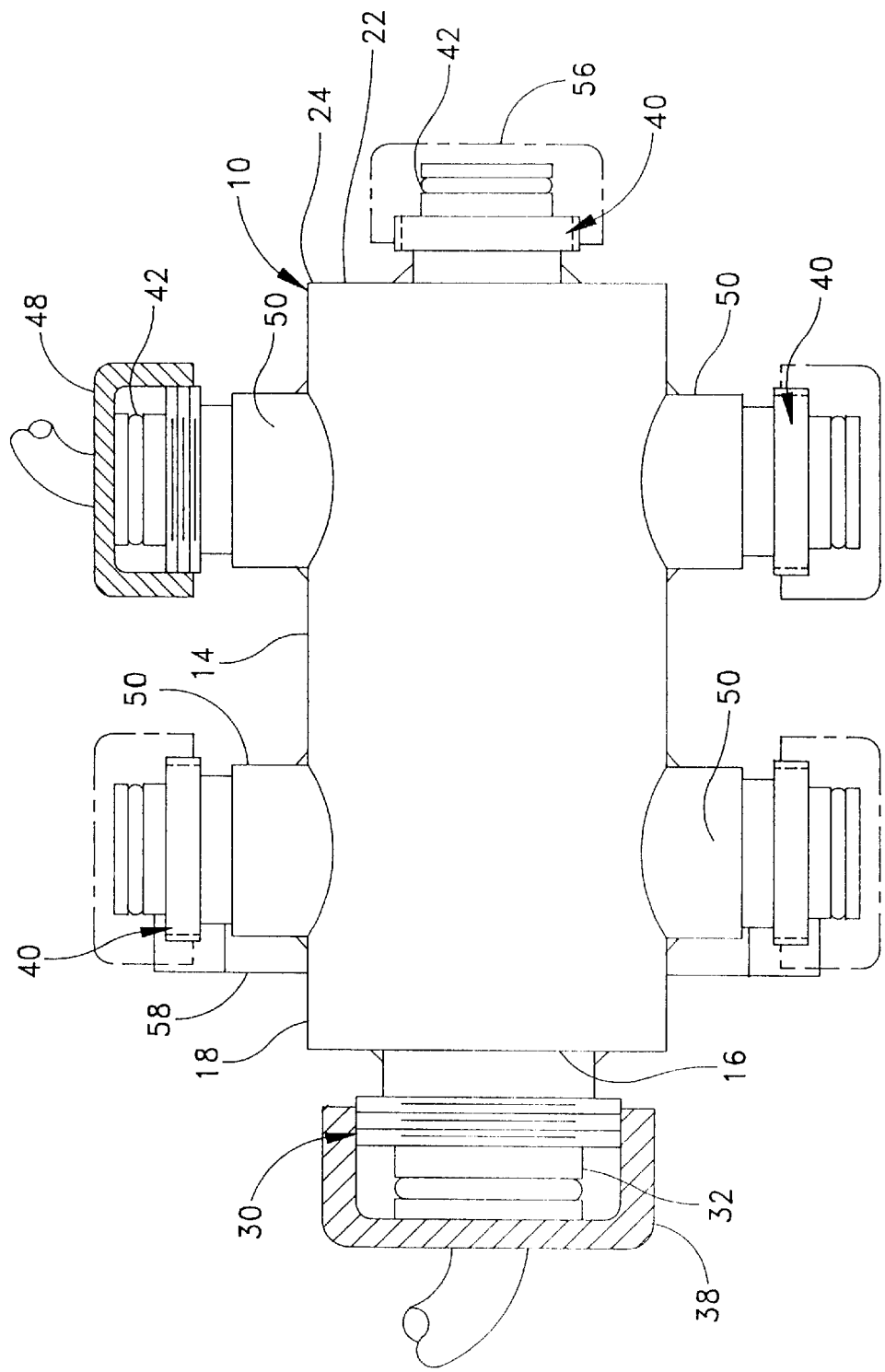
FIG. 2 is a top plan view of the junction box assembly of FIG. 1, with parts shown in section.

A main junction box connector assembly 30, including a main connector 32 and a main insert 34 (FIG. 3), is fixed, as by welding, in the first end hole 20. The insert 34 is provided with electrical leads 36 (FIG. 3), and the main connector 32 and leads 36 are adapted to receive a main cable end connector 38 (FIG. 2).

A secondary junction box connector assembly 40, including a secondary connector 42 and secondary insert 44 (FIG. 3), may be fixed in the second end hole 26. The secondary insert 44 is provided with electrical leads 46, and the secondary connector 42 and leads 46 are adapted to receive a secondary cable end connector 48 (FIG. 2).

The holes 12 in main body 10 are each provided with a secondary tubular body 50 (FIG. 2) fixed therein. In each secondary tubular body 50 there is fixed a junction box secondary connector assembly 40 similar to the junction box secondary connector assembly 40 fixed in second end hole 26 and described above. Each of the junction box secondary connector assemblies 40 is adapted to receive a secondary cable end connector 48 which threadedly engages with the junction box secondary connector 42 and urges a female plug (not shown) onto the male leads 46 in watertight fashion, as is known in the art.

A wiring harness 52 (FIG. 3) in electrical communication with electrical leads 36 of junction box main insert 34, extends through main insert 34 and into the interior of main body 10. Harness branches 54 (FIG. 3), each constituting a divided out portion of wiring harness 52, respectively feed into secondary connector inserts 44 and are, respectively, in communication with electrical leads 46. Thus, electrical signals received by junction box main connector assembly 30 are conveyed through the junction box to a selected number of cables extending from the box (provision for five cables shown in FIGS. 2 and 3). It will be apparent that the number of holes in main body 10 and the number of secondary connector assemblies 40 is to be selected for the tasks envisioned. While there must be at least one junction box main connector assembly, there may be any number of junction box secondary connector assemblies, but at least one.

The junction box connector assemblies 30, 40 may be covered in watertight fashion by a cover member 56, shown in phantom in the drawings, when the connector assemblies are not engaged by a cable end connector.

The junction box assembly typically is fixed to a support structure (not shown) by means of flanged legs 58 which interconnect the tubular main body 10 and the support structure, as by bolts, or other fasteners (not shown).

When it is necessary to re-wire, or otherwise repair, the assembly, the junction box is separated from its support structure by removal of the fasteners fixing the legs 58 to the support structure. The cable end connectors 38, 48, are then unscrewed from their respective junction box connectors 32, 42. The inserts 34, 44 are then pulled from their respective connector assemblies 30, 40. The wiring harness 52 is loosely disposed in main body 10, with extra length therein, such that upon withdrawal of an insert, a length of wiring harness 52, or harness branch 54, comes out with the insert, providing the inserts and accompanying wiring with freedom of movement for replacement or repair. Upon completion of repair, the inserts are returned to their connector assemblies, the junction box is reattached to the supporting structure, and the cable end connectors are screwed onto the junction box connector assemblies. If appropriate, one or more of the watertight covers 56, known in the art, are screwed onto junction box connector assemblies not in use.

The connector assemblies 30, 40 shown and/or discussed herein are well known and in wide use, at least in military applications, and provide reliable watertight integrity.

There is thus provided an electric cable junction box assembly suitable for outboard use on underwater vehicles and which, upon failure, or diminished performance, need not be discarded and replaced in toto as is currently the case, but is readily susceptible to repair. Inasmuch as the cost of an entire junction box assembly is substantial, the cost savings provided by the junction box shown and described herein are of decidedly meaningful benefit.

It will be understood that many additional changes in the details, materials, steps and arrangement of parts, which have been herein described and illustrated in order to explain the nature of the invention, may be made by those skilled in the art within the principles and scope of the invention as expressed in the appended claims.

What is claimed is:

1. An electric cable junction box assembly comprising:
   a tubular main body having at least one side hole through a side wall thereof;
   a first plate extending across a first end of the tubular main body, the first plate having a first end hole therethrough;
   a second plate extending across a second end of the tubular main body, the second plate having a second end hole therethrough;
   a junction box main connector assembly fixed in the first end hole and provided with electrical leads fixed in a recess in said junction box main connector assembly, said leads and said recess being adapted to receive a main cable end connector;
   a junction box secondary connector assembly fixed in a selected one of the at least one side hole and the second end hole, the secondary connector assembly having electrical leads fixed in a recess therein and being adapted to receive a secondary cable end connector;
   a wiring harness in said main body connected to said junction box main connector assembly and in electrical communication with said junction box main connector assembly leads, at least a branch of said wiring harness extending from a remainder of said wiring harness and fixed to said junction box secondary connector assembly and in electrical communication with said junction box secondary connector assembly leads;
   wherein said junction box main connector assembly comprises a main connector and a main insert disposed in said main connector, said electrical leads of said main connector assembly being mounted on said main insert, and said wiring harness being connected to said main insert;
   wherein said junction box main connector is further adapted to threadedly connect with, and disconnect from, a cover member;
   wherein said junction box secondary connector assembly comprises a secondary connector and a secondary insert disposed in said secondary connector, said electrical leads of said secondary connector assembly being mounted on said secondary insert, and at least a portion of said wiring harness being connected to said secondary insert; and
   wherein said junction box main connector is adapted to threadedly connect to, and disconnect from, a main cable end connector.

2. The junction box assembly in accordance with claim 1 wherein said junction box assembly main connector is adapted for attachment to said cover member in a watertight manner.

3. An electric cable junction box assembly comprising:
   a tubular main body having at least one side hole through a side wall thereof;
   a first plate extending across a first end of the tubular main body, the first plate having a first end hole therethrough;
   a second plate extending across a second end of the tubular main body, the second plate having a second end hole therethrough;
   a junction box main connector assembly fixed in the first end hole and provided with electrical leads fixed in a recess in said junction box main connector assembly, said leads and said recess being adapted to receive a main cable end connector;

a junction box secondary connector assembly fixed in a selected one of the at least one side hole and the second end hole, the secondary connector assembly having electrical leads fixed in a recess therein and being adapted to receive a secondary cable end connector;

a wiring harness in said main body connected to said junction box main connector assembly and in electrical communication with said junction box main connector assembly leads, at least a branch of said wiring harness extending from a remainder of said wiring harness and fixed to said junction box secondary connector assembly and in electrical communication with said junction box secondary connector assembly leads; and wherein upon disconect of said main cable end connector from said junction box assembly main connector, said main insert is removable from said main connector assembly, along with a portion of said wiring harness.

4. The junction box assembly in accordance with claim 3 wherein said junction box secondary connector assembly is fixed in said second end hole in said second plate.

5. The junction box assembly in accordance with claim 4 wherein said junction box assembly comprises at least one additional junction box secondary connector assembly fixed in said hole in said side wall of said main body.

6. The junction box assembly in accordance with claim 5 wherein a secondary tubular body is fixed in each of said holes in said side wall of said main body, and each of said secondary connector assemblies mounted in said side wall is fixed in one of said secondary tubular bodies.

7. The junction box assembly in accordance with claim 3 wherein:

said junction box main connector assembly comprises a main connector and a main insert disposed in said main connector, said electrical leads of said main connector assembly being mounted on said main insert, and said wiring harness being connected to said main insert;

said junction box secondary connector assembly comprises a secondary connector and a secondary insert disposed in said secondary connector, said electrical leads of said secondary connector assembly being mounted on said secondary insert, and at least a portion of said wiring harness being connected to said secondary insert;

each of said junction box secondary connectors is adapted to threadedly connect to, and disconnect from, a secondary cable end connector; and said secondary assembly inserts are removable from their respective secondary connector assemblies with a further portion of said wiring harness upon said disconnect of said secondary cable end connectors from said junction box assembly secondary connectors.

8. The junction box assembly in accordance with claim 7 wherein said wiring harness and said wiring harness branches in said main body are of a length substantially greater than shortest hypothetical lines between said junction box main insert and said secondary inserts, such that upon withdrawal of said inserts from said main body, each of said inserts is accompanied by a sufficient length of wiring harness and wiring harness branch to facilitate free movement of said withdrawn inserts.

9. The junction box assembly in accordance with claim 3 further comprising legs fixed to and extending from said main body for releasable connection to a support structure.

10. The junction box assembly in accordance with claim 7 wherein said junction box assembly connectors are adapted for attachment to said cable end connectors in a watertight manner.

11. The junction box assembly in accordance with claim 7 wherein each of said junction box secondary connectors is further adapted to threadedly connect to, and disconnect from, a cover member.

12. The junction box assembly in accordance with claim 11 wherein said junction box assembly secondary connectors are each adapted for attachment to said cover member in a watertight manner.

13. An electric cable junction box assembly comprising:

a tubular main body having at least one side hole through a side wall thereof;

a first plate extending across a first end of the tubular main body, the first plate having a first end hole therethrough;

a second plate extending across a second end of the tubular main body, the second plate having a second end hole therethrough;

a junction box main connector assembly fixed in the first end hole and provided with electrical leads fixed in a recess in said junction box main connector assembly, said leads and said recess being adapted to receive a main cable end connector;

a junction box secondary connector assembly fixed in a selected one of the at least one side hole and the second end hole, the secondary connector assembly having electrical leads fixed in a recess therein and being adapted to receive a secondary cable end connector;

a wiring harness in said main body connected to said junction box main connector assembly and in electrical communication with said junction box main connector assembly leads, at least a branch of said wiring harness extending from a remainder of said wiring harness and fixed to said junction box secondary connector assembly and in electrical communication with said junction box secondary connector assembly leads;

wherein said junction box secondary connector assembly comprises a secondary connector and a secondary insert disposed in said secondary connector, said electrical leads of said secondary connector assembly being mounted on said secondary insert, and at least a portion of said wiring harness being connected to said secondary insert; and wherein said wiring harness and said wiring harness branches in said main body are of a length substantially greater than shortest hypothetical lines between said junction box main insert and said secondary inserts, such that upon withdrawal of said inserts from said main body, each of said inserts is accompanied by a sufficient length of wiring harness and wiring harness branch to facilitate free movement of said withdrawn inserts.

* * * * *